(12) United States Patent
Widzgowski

(10) Patent No.: US 7,554,722 B2
(45) Date of Patent: Jun. 30, 2009

(54) SCANNING MICROSCOPE WITH SCANNER FREQUENCY DERIVED FROM PULSED LASER

(75) Inventor: Bernd Widzgowski, Dossenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 446 days.

(21) Appl. No.: 11/544,367

(22) Filed: Oct. 6, 2006

(65) Prior Publication Data

US 2007/0081234 A1    Apr. 12, 2007

(30) Foreign Application Priority Data

Oct. 6, 2005    (DE)    ........................ 10 2005 047 884

(51) Int. Cl.
*G02B 21/00* (2006.01)
(52) U.S. Cl. ........................................ 359/368; 250/205
(58) Field of Classification Search ................. 359/368, 359/385; 250/205
See application file for complete search history.

(56) References Cited

U.S. PATENT DOCUMENTS

| | | | | |
|---|---|---|---|---|
| 4,800,270 A | * | 1/1989 | Blais | ........................... 250/235 |
| 4,902,966 A | * | 2/1990 | Brust et al. | .................. 324/751 |
| 4,972,258 A | * | 11/1990 | Wolf et al. | ..................... 348/79 |
| 5,121,138 A | * | 6/1992 | Schermer et al. | ............. 347/250 |
| 5,187,364 A | * | 2/1993 | Blais | ........................... 250/236 |
| 5,296,703 A | * | 3/1994 | Tsien | .......................... 250/235 |
| 6,037,583 A | * | 3/2000 | Moehler et al. | .............. 250/235 |
| 6,418,153 B1 | * | 7/2002 | Engelhardt et al. | ............. 372/24 |
| 6,426,490 B1 | * | 7/2002 | Storz | ........................ 250/201.3 |
| 6,859,294 B2 | * | 2/2005 | Widzgowski | ................ 359/199 |
| 7,268,344 B2 | * | 9/2007 | Sasaki et al. | .................. 250/234 |
| 2001/0015411 A1 | | 8/2001 | Ohdaira et al. | |
| 2005/0012993 A1 | * | 1/2005 | Araya | .......................... 359/385 |
| 2006/0157638 A1 | * | 7/2006 | Takamizawa | ................ 250/205 |

FOREIGN PATENT DOCUMENTS

| | | |
|---|---|---|
| DE | 3037983 | 4/1982 |
| DE | 19702752 | 7/1998 |
| DE | 10126286 | 12/2002 |
| EP | 0299432 A2 | 7/1988 |
| EP | 0845693 A1 | 6/1998 |
| JP | 55021056 A * | 2/1980 |
| JP | 2007114505 A * | 5/2007 |

* cited by examiner

*Primary Examiner*—Alessandro Amari
*Assistant Examiner*—Mark Consilvio
(74) *Attorney, Agent, or Firm*—Simpson & Simpson, PLLC

(57) ABSTRACT

A scanning microscope (1) and a scanning method are disclosed. The scanning microscope (1) has, arranged in the illuminating light beam path (3), an outcoupling element (60) that couples out at least a fraction of the illuminating light beam (3) and directs it to a detector (61) that detects the pulse frequency of the light source that generates the illuminating light beam; and the pulse frequency serves as a basic clock frequency for the scanner.

22 Claims, 5 Drawing Sheets

SCANNING MICROSCOPE WITH SCANNER FREQUENCY DERIVED FROM PULSED LASER

CROSS REFERENCE TO RELATED APPLICATION

This application claims priority of German Patent Application 10 2005 047 884.0, filed Oct. 6, 2005, which application is incorporated by reference herein.

FIELD OF THE INVENTION

The present invention relates to a scanning microscope. The invention relates in particular to a scanning microscope having a light source that emits a pulsed illuminating light beam, a scanning device that guides the illuminating light beam through a scanning optical system and a microscope optical system and over or through a specimen, and a detector unit that receives the light emanating from the specimen and generates detected signals.

The sample to be examined is scanned point-by-point by a laser beam with the aid of mirror galvanometers. The luminescent or fluorescent light emitted from the sample is conveyed to a detector that outputs an electrical signal proportional to the light power level.

BACKGROUND OF THE INVENTION

For many applications, e.g. in the case of multi-photon excitation, it is necessary to use as a light source a laser that delivers light in the form of short pulses. Because of their design, some of these lasers, e.g. diode lasers, are synchronizable with an external timing source; others such as, for example, fiber lasers or TiSa lasers, are not synchronizable.

It is problematic that the scanning device and the pulsed light source are operated independently of one another.

The invention further relates to a scanning method using a scanning microscope.

German Unexamined Application DE 101 26 286 A1 discloses a method and an apparatus for point-by-point scanning of a sample. The method is characterized by the steps of generating a setpoint signal for each scanned point, and transferring the setpoint signal to a scanning device. In further steps an actual signal is ascertained, from the position of the scanning device, for each scanned point. Also performed are detection of at least one detected signal for each scanned point, calculation of a display signal and an image point position from the actual signal and/or the setpoint signal and the detected signal, and allocation of the display signal to the image point position.

German Unexamined Application DE 197 02 752 A1 refers to a triggering system for a scanner, in particular for a laser scanning microscope, having an oscillating motor for driving an oscillating mirror that serves for linearly oscillating deflection of a ray bundle. A triggering unit is provided for supplying the oscillating motor with an excitation current that is modifiable in terms of triggering frequency, frequency curve, and amplitude. Triggering is accomplished with a function generator that is connected to the triggering unit, and with a measured value transducer for obtaining a sequence of data regarding the deflected positions of the oscillating mirror. The measured value transducer is linked to the function generator via a logic unit for ascertaining correction values for the excitation current. It is thereby possible, with an evaluation of the information made available from the measured value transducer regarding the actual deflected position of the oscillating mirror, to ascertain correction values with the aid of the logic unit. Said values can in turn be used to influence the triggering frequencies outputted by the function generator in such a way that deviations are minimized or entirely eliminated.

European Patent Application EP 0 845 693 A1 discloses a confocal microscope and a method for generating three-dimensional images with the use of said microscope. The sample to be examined is scanned two-dimensionally. In order to generate three-dimensional images, the specimen support and the specimen are moved relative to one another.

The pulse frequency of the non-synchronizable lasers that are of interest for image acquisition especially in the context of multi-photon excitation is preferably in the range from 80 MHz to 90 MHz. The scanning frequency of the scanning system can lie in a range from 40 MHz to 45 MHz.

The pulse frequency of the laser can, however, also be above 100 MHz, and the scanning frequency of the scanning system can be much less than 40 MHz.

Looking at the input circuit of the detection circuit up to the A/D converter, that circuit exhibits a low-pass behavior. When light pulses having a time constant $T_L$ are then detected, the signal first rises at the end of the low-pass, and then drops off again (see FIG. 2a). The converter receives a different measurement result depending on the point in time at which the A/D converter converts the voltage value with time constant $T_i$ at its input, despite identical pulse shapes and pulse heights. These errors are superimposed on the actual image brightness signal of the sample, and manifest themselves as a striped pattern in the image (see FIG. 3). Because these artifacts have a certain regularity, they are particularly apparent to the observer as a jitter in the brightness of the structures being examined.

In addition, because of the stroboscope-like illumination of the sample or specimen, only the brightness datum at a specific location in the sample is delivered to the detector. The fluctuation of this observation instant relative to the sampling instant of the A/D converter causes an apparent migration of structures in the region in which the scanned point moves between two A/D converter sampling events. The observer therefore perceives a jitter in the location of the structure being examined.

SUMMARY OF THE INVENTION

It is the object of the invention to create a scanning microscope with which image quality is improved, system-related artifacts being avoided.

The object is achieved by a scanning microscope that encompasses the features of Claim 1.

It is the object of the invention to create a method that uses a scanning microscope, such that by way of the method, image quality is improved and system-related artifacts are avoided.

The object is achieved by a method that encompasses the features of claim 13.

According to the present invention, there is arranged in the illuminating light beam path an outcoupling element that couples out at least a fraction of the illuminating light beam and directs it to a detector, the pulses of the light source that generates the illuminating light beam being ascertained by evaluation electronics.

Placed after the detector unit is a digital circuit that, with the aid of a comparator having an adjustable switching threshold, prepares the detected pulse signal of the light source and delivers it to the scanning device as a reference clock cycle.

In a further embodiment of the invention, a frequency divider, which adapts the pulse frequency of the laser to the possible input frequency range of the scanning device, is provided between the detector and the electronic control system. The clock frequency of the scanning device is adaptable, in this context, to the pulse frequency of the light source.

Advantageous embodiments of the invention may be inferred from the dependent claims.

BRIEF DESCRIPTION OF THE DRAWINGS

The subject matter of the invention is depicted schematically in the drawings and is described below with reference to the Figures, in which.

DETAILED DESCRIPTION OF THE INVENTION

Figure 1:
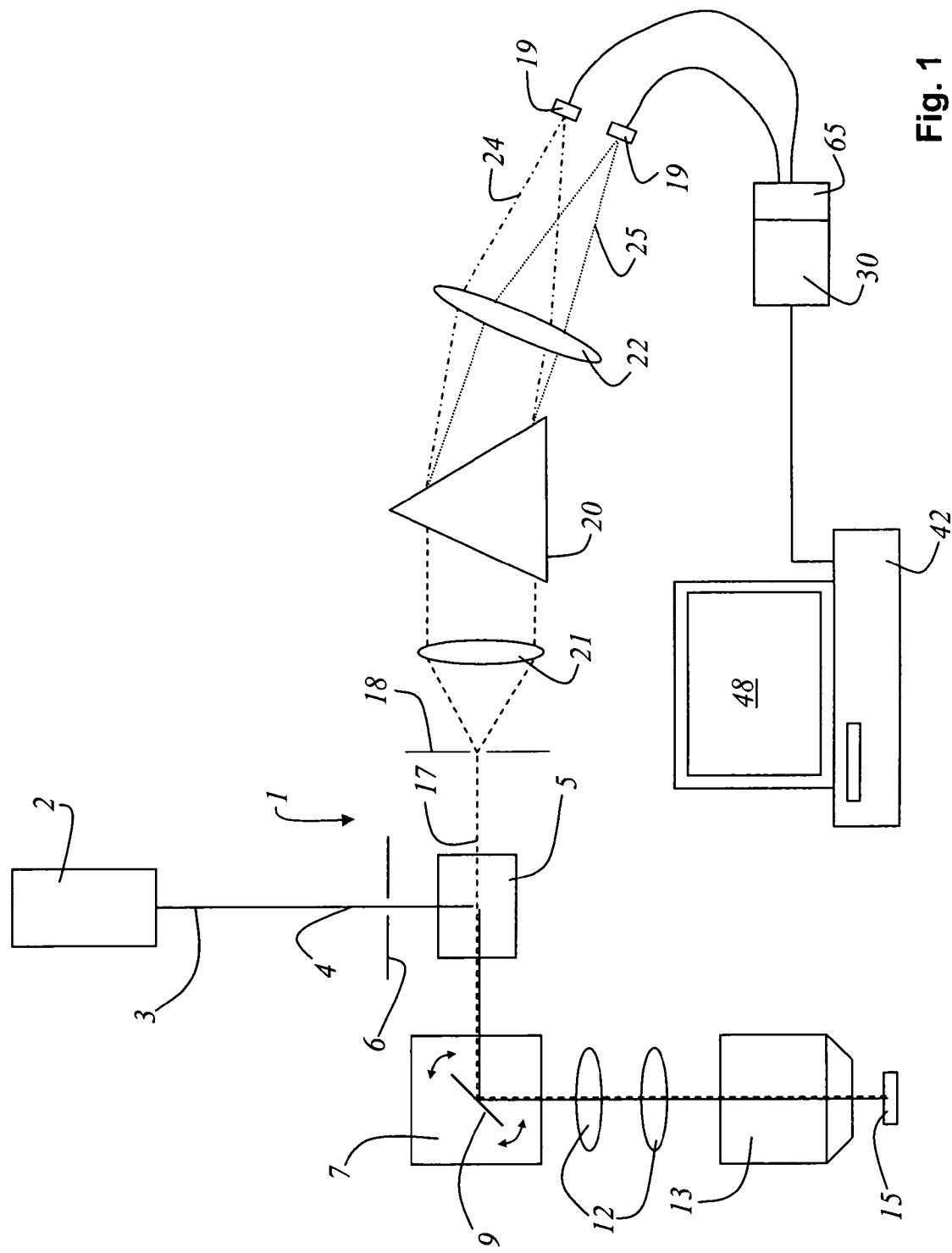
FIG. 1 schematically depicts a scanning microscope that encompasses a scanning device with which the specimen is scanned.

FIG. 1 shows the schematic construction of a confocal scanning microscope 1 in which the apparatus according to the present invention can be implemented. Scanning microscope 1 encompasses a detector unit 19 that can be configured in a variety of embodiments. Illuminating light beam 3 coming from at least one illumination system 2 is directed by a beam splitter or a suitable deflection means 5 to a scanning device 7. For many experiments it is necessary to use a laser as a light source in illumination system 2. The laser can preferably emit light in the form of short pulses. Before illuminating light beam 3 strikes deflection means 5, it passes through an illumination pinhole 6. Scanning device 7 encompasses at least one scanning mirror 9 that guides illuminating light beam 3 through a scanning optical system 12 and a microscope optical system 13 and over or through a specimen 15. Scanning motor 9 can be driven via a motor (not depicted); a torsion rod can additionally be provided, with which scanning mirror 9 is also drivable as a resonant scanning mirror 9. In the case of non-transparent specimens 15, illuminating light beam 3 is guided over the specimen surface. With biological specimens 15 (preparations) or transparent specimens, illuminating light beam 3 can also be guided through specimen 15. For these purposes, non-luminous specimens are prepared, as applicable with a suitable dye (not depicted because it is established existing art). The dyes present in specimen 15 are excited by illuminating light beam 3, for example, to fluoresce, and emit light in a characteristic region of the spectrum specific to them. This luminescent or fluorescent light emanating from specimen 15 defines a detected light beam 17. The latter travels through microscope optical system 13 and scanning optical system 12 and via scanning module 7 to deflection means 5, traverses the latter, and travels via a detection pinhole 18 onto detector unit 19.

Detector unit 19 can be made up of at least one photomultiplier. It is likewise conceivable for detector unit 19 to be made up of a photomultiplier array, a CCD chip, an EMCCD chip, or an APD array. Detected light beam 17 emanating from or defined by specimen 15 is depicted in FIG. 1 as a dashed line. Electrical detected signals proportional to the power level of the light emanating from specimen 15 are generated in detector unit 19. Because, as already mentioned above, light of not only one wavelength is emitted from specimen 15, it is useful to provide a dispersive element 20 in front of detector unit 19. Dispersive element 20 spectrally divides the detected light beam so that the individual wavelengths of the detected light are spatially spectrally separated. Placed in front of dispersive element 20 is a lens 21 that spreads detected light beam 17 and makes it parallel. Placed after dispersive element 20 is a further lens 22 that focuses spectrally separated beams 24, 25 of detected light beam 17 onto detector unit 19. Spectrally separated beams 24, 25 differ in terms of wavelength, and thus strike detector elements, e.g. photomultipliers or, if detector 19 is configured as a chip, different regions of the chips. The signals furnished by detector unit 19 are conveyed to a digital circuit 30 in which collection of the detector signals takes place. Digital circuit 30 can furthermore be connected to a computer 42, associated with which is a display 48 on which, for example, image data can be displayed.

Figure 5:
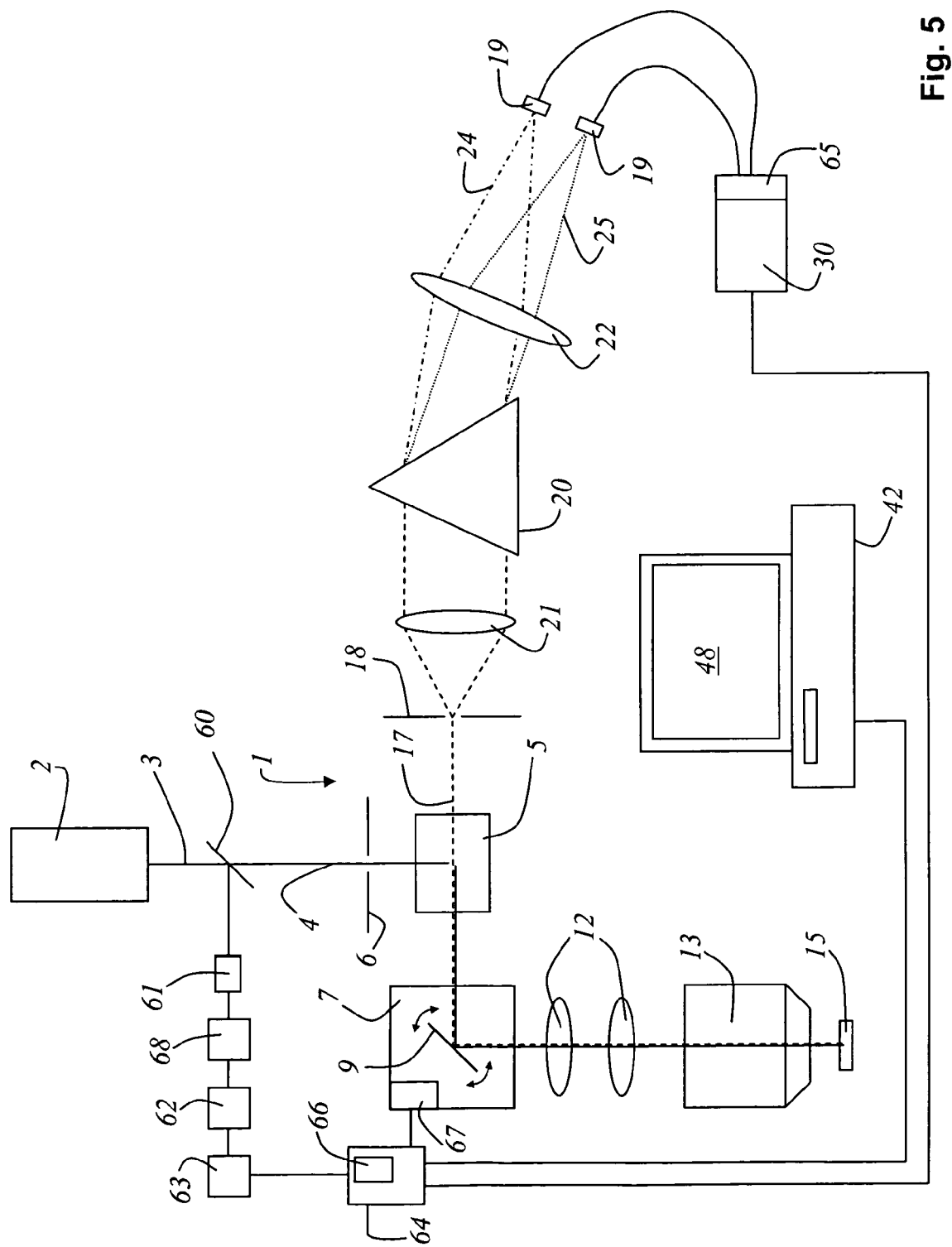
FIG. 5 schematically depicts a scanning microscope that encompasses a scanning device with which the specimen is scanned, in which synchronization between the pulse frequency and sampling frequency is achieved.

As depicted in FIG. 5, the laser pulses of illumination system 2 are picked off with the aid of a photosensitive element, e.g. a photodiode, and this pulse chain is adapted by means of a frequency divider, when necessary, to the possible input frequency range of the scanner. The scanner possesses an arrangement allowing this clock signal to be selected as a baseline clock cycle. If no external clock signal is present, this fact must be detectable so that operation can switch over to a clock source internal to the scanner.

In order to allow optimum utilization of the light pulse emitted from the laser, an apparatus for influencing the phase of the clock cycle fed into the scanner is also provided.

Figure 2A:
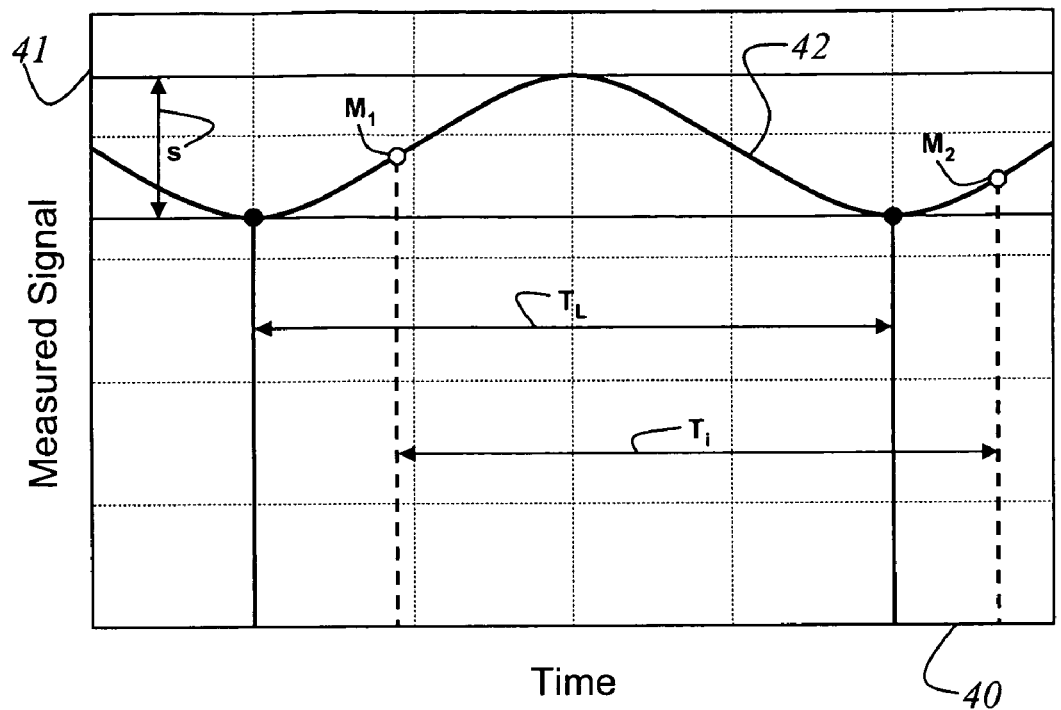
FIG. 2a graphically depicts signal sampling in the context of pulsed operation, the analog/digital conversion system in the detector unit (19) exhibiting a low-pass behavior.

FIG. 2a graphically depicts signal sampling in the context of pulsed operation of illumination system 2. The system for analog/digital conversion of the signals of detector unit 19 exhibits a low-pass behavior. Time is plotted on abscissa 40, and the measured signal on ordinate 41. Double arrow s designates the signal height of the light pulses. The individual light pulses are detected with time constant $T_L$. Because of the low-pass behavior of the circuit, signal 42 initially rises and then drops off again. Integration of the signals from detector unit 19 is carried out in digital circuit 30. Digital circuit 30 is placed after detector unit 19 (see FIG. 1), which periodically interrogates the detected signals within a pixel $P_{x,y}$ and calculates, for example, an average therefrom.

Figure 2B:
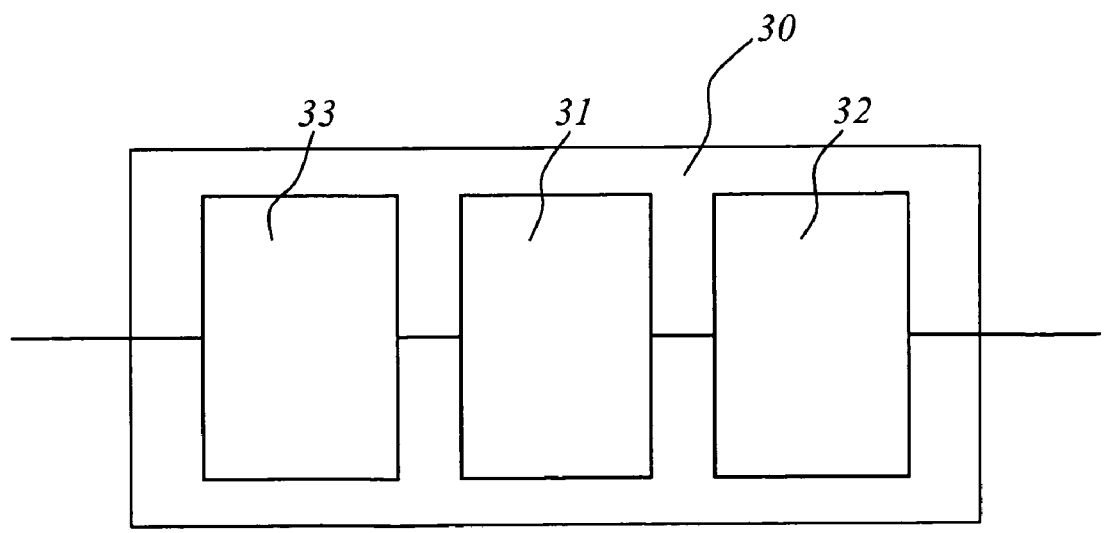
FIG. 2b shows the construction of the digital circuit.

FIG. 2b shows the construction of digital circuit 30. Digital circuit 30 contains a summing element 31 that sums the multiple periodic detected signals within a pixel $P_{x,y}$ (see FIG. 3). Digital circuit 30 furthermore contains a dividing element 32 that divides the sum of the multiple detected signals by a number of detected signals that were summed within the respective pixel $P_{x,y}$. In a further embodiment of the invention, a multiplying element 33 is placed before summing element 31 and divider 32 in digital circuit 30. By means of a digital multiplication (before summing element 31 and the following dividing element 32) it is also possible to achieve a signal amplification, thereby increasing the numerical precision. As a result of the digital integration, the output value of detector unit 19, and thus the image brightness, is independent of the scanning speed and scan format. The averaging furthermore decreases the noise in the output data and also minimizes digitization errors ("outliers"). Interfering effects such as, for example, parameter drift of the analog components (due to temperature, aging, component tolerances) are decreased or eliminated as a result of the digitization.

$T_i$ designates the point in time, or time constant, at which the A/D converter converts the voltage value from detector unit 19 at its input. As depicted in FIG. 2a, a different measurement result $M_1$ or $M_2$ is obtained each time, despite identical pulse shapes and pulse heights.

Figure 3:
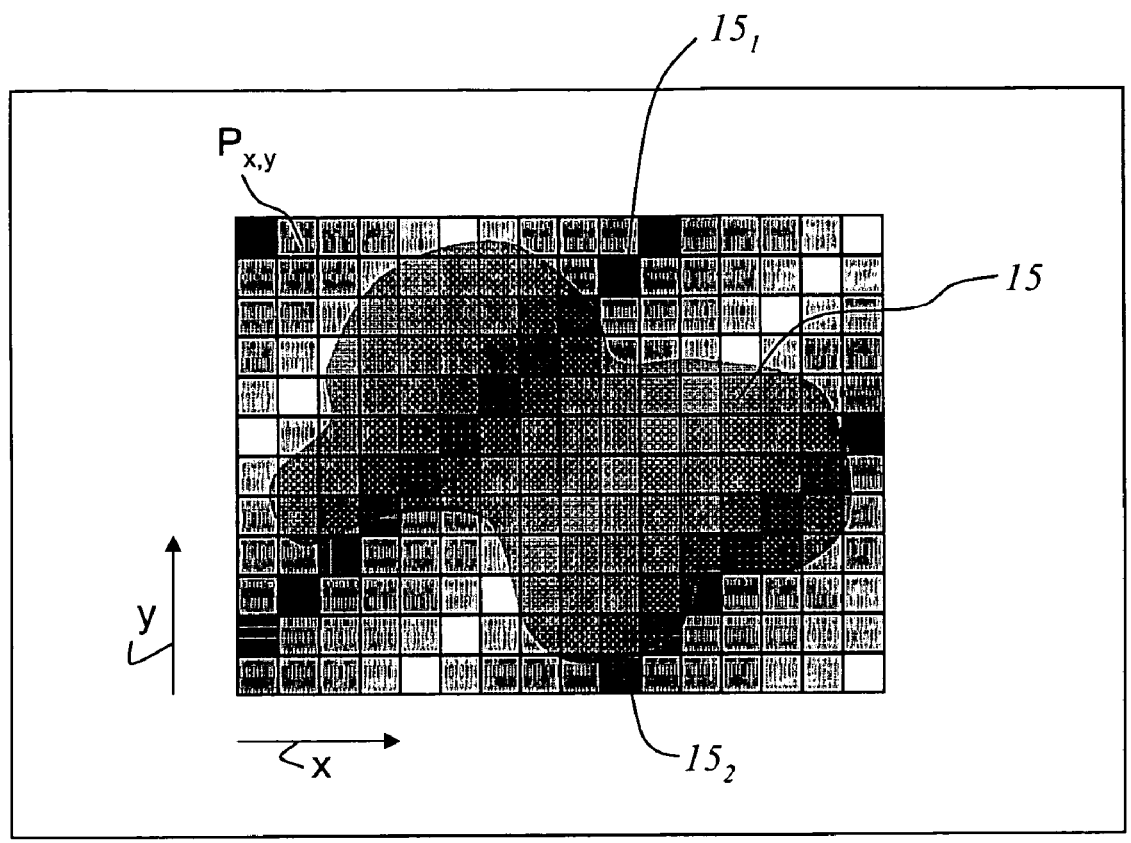
FIG. 3 graphically depicts the creation of patterns (which can also migrate) as a result of superimposition of the error signal.

These errors are superimposed on the actual image brightness signal of the sample or specimen 15, and manifest themselves as a striped pattern in the image that is presented on display 48. FIG. 3 graphically depicts the creation of patterns $15_1$, $15_2$, which can also migrate, as a result of the superimposition of the error signal. Because of the low-pass behavior of digital circuit 30, what results after detection of the laser pulses with time constant $T_L$ is fluctuation width s of the digitized results due to different sampling instants within interval $T_i$ (see FIG. 2a).

Because these artifacts have a certain regularity, they are particularly apparent to the observer as a jitter in the brightness of the structures being examined.

In addition, because of the stroboscope-like illumination of sample 15, only the brightness datum at a specific location in sample 15 is delivered to detector 19. The fluctuation of this observation instant relative to the sampling instant of the A/D converter causes an apparent migration of structures in the region in which the scanned point moves between two A/D converter sampling events; in other words, a corresponding jitter also occurs in the location of the structure being examined.

Figure 4:
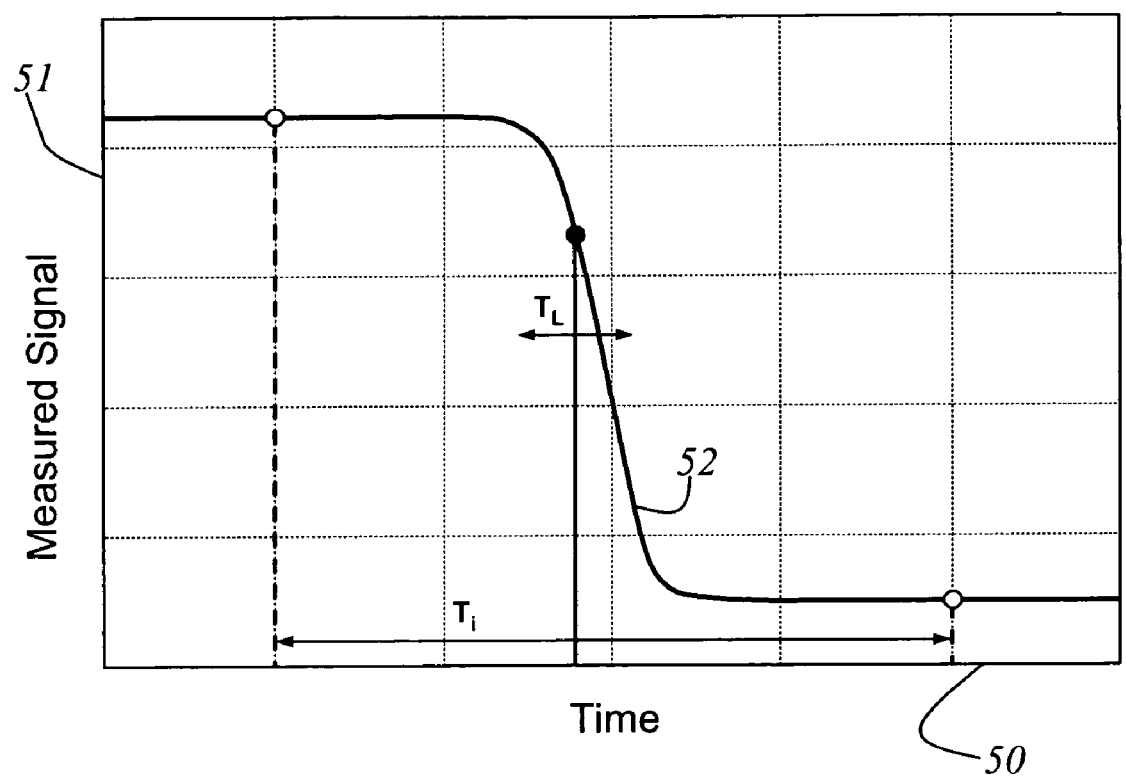
FIG. 4 graphically depicts the creation of a measurement error regarding location, upon a change in the emission properties of the sample or specimen.

FIG. 4 graphically depicts the creation of a measurement error regarding location, upon a change in the emission properties of the sample or specimen 15. Time is plotted on abscissa 50, and measured signal 52 on ordinate 51. Measured signal 52 shows, for example, a brightness jump (from light to dark) that can be caused by the emission behavior of sample 15 as a function of location. Depending on when in interval $T_L$ the laser pulse occurs, a high or a low intensity is detected in sampling interval $T_i$ of A/D converter 65.

FIG. 5 schematically depicts a scanning microscope 1 that encompasses a scanning device 7 with which specimen 15 is scanned, in which synchronization between the pulse frequency and sampling frequency is achieved. Scanning device 7 has a basic clock cycle that is derived from the clock cycle of the laser. The frequencies of scanning device 7 and of illumination system 2, or of the laser used, are thus synchronized.

For this purpose, there is arranged in illuminating light beam 3 an outcoupling element 60 that couples out at least a fraction of illuminating light beam 3 and directs it to a detector 61. The pulse frequency of the light source that generates illuminating light beam 3 is ascertained via detector 61. Outcoupling element 60 can be, for example, a beam splitter, and detector 61 can be a photosensitive element, e.g. a photodiode. Digital circuit 30 is placed after detector unit 19. Digital circuit 30 also encompasses an A/D converter 65 for the signals of detector unit 19.

In addition, the pulse frequencies of illumination system 2, or of the laser used, that are ascertained by detector 61 can be adapted by a frequency divider 63 to the possible input frequency range of scanning device 7. Placed after detector 61 is a digital circuit 68 that delivers the ascertained pulse chain of the light source to scanning device 7 as a clock signal, and derives the baseline clock cycle therefrom. Electronic control system 64 encompasses an apparatus 66 with which the clock signal of the laser can be selected as a baseline clock cycle. If there is no laser clock signal, this fact can also be automatically detected by apparatus 66, so that operation switches over to an internal clock source 67 of scanning device 7.

A delay circuit 62 can furthermore be provided between detector 61 and frequency divider 63. Delay circuit 62 influences the phase of the clock cycle fed into scanning device 7, so that the light pulse emitted by the laser is completely usable.

An electronic control system 64 for scanning device 7 receives both the detected signal of detection electronics 30 and the measured signal of detector 61. The two signals are synchronized with the aid of digital circuit 68 and electronic control system 64. This can be controlled via a computer 42.

Detector 61 for ascertaining the pulses of illumination system 2 can be a photosensitive element, e.g. a photodiode. The pulse frequency of illumination system 2 is preferably approximately twice the clock frequency of scanning device 2.

The pulse frequency of the laser is preferably in the range from 80 MHz to 90 MHz, but can also be substantially higher. The scanning frequency of scanning device 7 can lie in a range from 40 MHz to 45 MHz, the standard frequency being 40 MHz. This frequency can, however, also be substantially lower. Looking at the input circuit of digital circuit 30 up to A/D converter 65, that circuit exhibits a low-pass behavior. A synchronization of scanning device 7 in scanning microscope 1 is accomplished with the additional electronic control system. The sample or specimen 14 is scanned with a pulsed laser beam or illuminating light beam 3 via a scanning device 7 that encompasses mirror galvanometers. The light emitted from sample 15 is sensed pixel-by-pixel with the aid of detector unit 19. The pulses of the laser are sensed instrumentally, and the measured signal is delivered to scanning device 7 as a reference frequency.

What is claimed is:

1. A scanning microscope having a light source that emits a pulsed illuminating light beam (3), a scanning device (7) that guides the illuminating light beam (3) through a microscope optical system (13) and over or through a specimen (15), and a detector unit (19) that receives the light emanating from the specimen (15) and generates detected signals, wherein there is arranged in the illuminating light beam path (3) an outcoupling element (60) that couples out at least a fraction of the illuminating light beam (3) and directs it to a detector (61) that detects the pulses of the light source and delivers the pulse signal to the scanning device (7).

2. The scanning microscope according to claim 1, wherein a digital circuit (30) is placed after the detector unit (19), which circuit also encompasses an A/D converter (65) for the signals from the detector unit (19).

3. The scanning microscope according to claim 1, wherein the detector for ascertaining the pulses of the light source is a photosensitive element.

4. The scanning microscope according to claim 1, wherein the light source is a laser.

5. The scanning microscope according to claim 4, wherein a frequency divider (63), which adapts the clock frequency of the scanning device (7) to the possible pulse frequency range of the laser, is provided after the detector.

6. The scanning microscope according to claim 5, wherein the electronic control system encompasses an apparatus (66) with which the clock signal of the laser can be selected as a baseline clock cycle, and/or an absence of the clock signal of the laser is automatically detected so that operation can switch over to an internal clock source (67) of the scanning device (7).

7. The scanning microscope according to claim 5, wherein a delay circuit (62) is provided between the detector (61) and the frequency divider (63).

8. The scanning microscope according to claim 7, wherein the delay circuit (62) influences the phase of the clock cycle fed into the scanning device (7), so that a light pulse emitted by the laser is completely usable.

9. The scanning microscope according to claim 1, wherein a digital circuit (68) is placed after the detector (61), which circuit delivers the ascertained pulse chain of the light source to the scanning device (7) as a clock signal, and derives the baseline clock cycle therefrom.

10. The scanning microscope according to claim 9, wherein the digital circuit (68) encompasses a comparator having an adjustable switching threshold.

11. The scanning microscope according to claim 10, wherein the pulse frequency of the light source lies in the range from 80 to 90 MHz.

12. The scanning microscope according to claim 10, wherein the scanning device (7) possesses a clock frequency in the range from 40 to 45 MHz.

13. A scanning method using a scanning microscope, the scanning microscope encompassing a light source that emits a pulsed illuminating light beam (3), a scanning device (7) that guides the illuminating light beam (3) through a microscope optical system (13) and over or through a specimen (15), and a detector unit (19) with which the light emanating from the specimen (15) is received and detected signals are generated,
characterized by the following steps: that with an outcoupling element, at least a fraction of the illuminating light beam (3) is directed onto a detector; the pulses of the light source are detected; and the pulse signal is delivered to the scanning device (7).

14. The method according to claim 13, wherein a digital circuit (68) is placed after the detector (61), which circuit delivers the ascertained pulse chain of the light source to the scanning device (7) as a clock signal, and derives the baseline clock cycle therefrom.

15. The method according to claim 13, wherein the light source is a laser.

16. The method according to claims 15, wherein a frequency divider, with which the clock frequency of the scanning device (7) is adapted to the possible pulse frequency range of the laser, is provided after the detector.

17. The method according to claim 16, wherein the electronic control system encompasses an apparatus with which the clock signal of the laser can be selected as a baseline clock cycle, and/or an absence of the clock signal of the laser is automatically detected so that operation switches over to an internal clock source of the scanning device (7).

18. The method according to claim 16, wherein a delay circuit is provided between the detector and the frequency divider.

19. The method according to claim 18, wherein the delay circuit influences the phase of the clock cycle fed into the scanning device (7), so that a light pulse emitted by the laser is completely utilized.

20. The method according to claim 13, wherein the pulses of the light source are ascertained with the aid of a photosensitive element.

21. The method according to claim 20, wherein the pulse frequency of the light source lies in the range from 80 to 90 MHz.

22. The method according to claim 20, wherein the scanning device (7) possesses a clock frequency in the range from 40 to 45 MHz.

* * * * *